Jan. 20, 1925.　　　　　　　　　　　　　　　1,523,889
W. H. PARKIN
VEHICLE TRUCK
Filed Oct. 31, 1922　　　　2 Sheets-Sheet 1
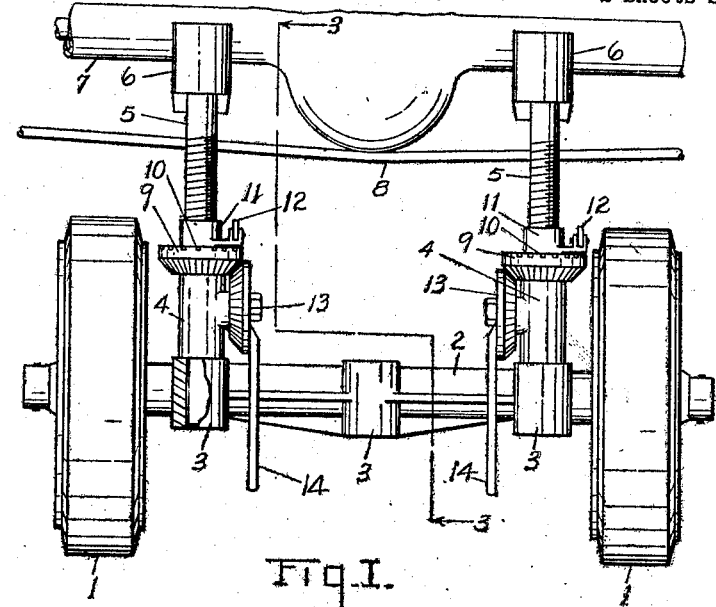
Fig. I.
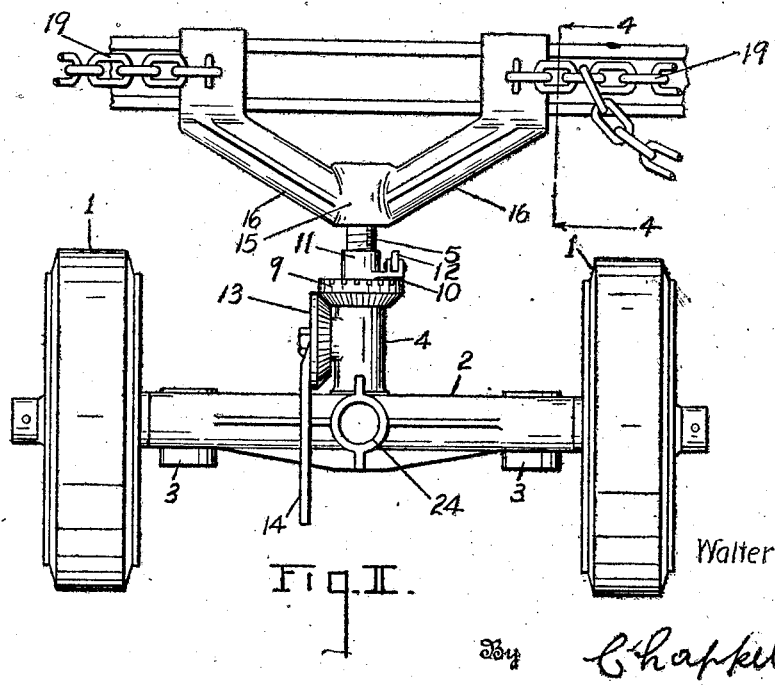
Fig. II.
Inventor
Walter H. Parkin
By Chappell Earl
Attorney Jan. 20, 1925.  W. H. PARKIN  1,523,889
VEHICLE TRUCK
Filed Oct. 31, 1922    2 Sheets-Sheet 2
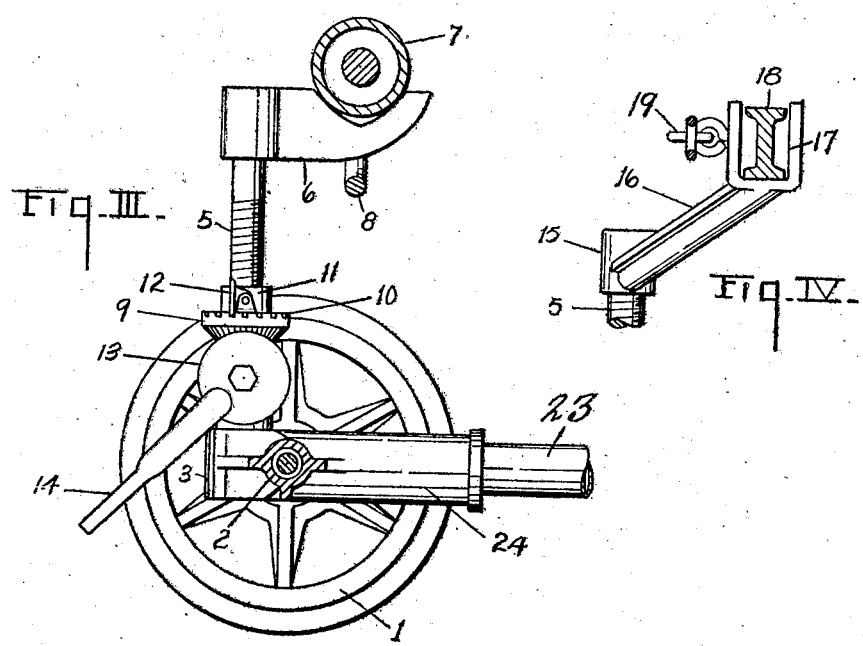
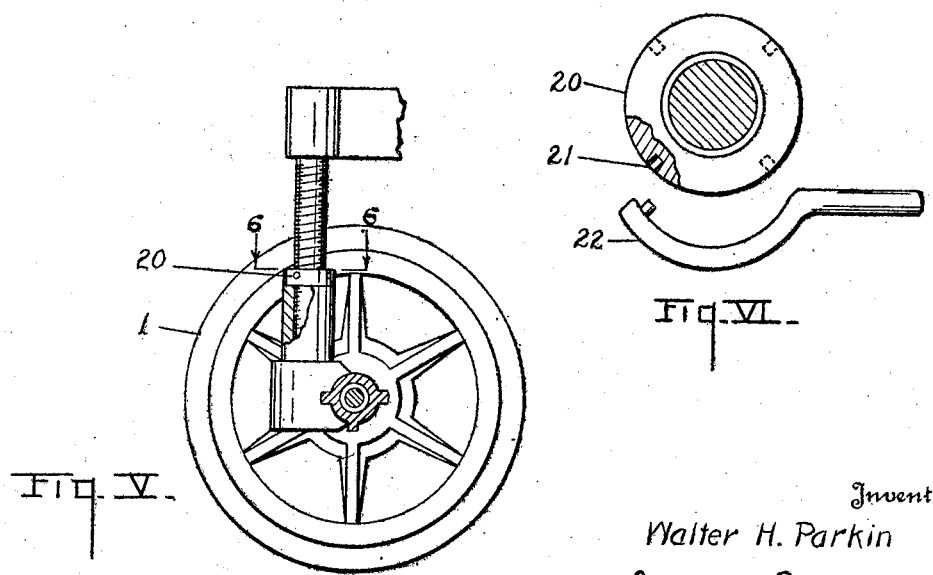
Inventor
Walter H. Parkin
By Chappell & Earl
Attorneys Patented Jan. 20, 1925.

1,523,889

UNITED STATES PATENT OFFICE.

WALTER H. PARKIN, OF NILES, MICHIGAN, ASSIGNOR TO NATIONAL-STANDARD COMPANY, OF NILES, MICHIGAN.

VEHICLE TRUCK.

Application filed October 31, 1922. Serial No. 598,114.

*To all whom it may concern:*

Be it known that I, WALTER H. PARKIN, a citizen of the United States, residing at Niles, county of Berrien, State of Michigan, have invented certain new and useful Improvements in Vehicle Trucks, of which the following is a specification.

This invention relates to improvements in vehicles trucks.

The main object of the invention is—

To provide an improved vehicle truck for the transporting of wrecked or damaged vehicles, such as automobiles, which is very easily adjusted to the truck or removed therefrom, either to support the front axle or the rear axle as may be desired.

A further object is to provide an improved vehicle truck which is light in weight and at the same time is strong and durable.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a rear view of my improved vehicle truck adapted for engagement with the rear axle of a vehicle, the axle being conventionally shown.

Fig. II is a front elevation of my improved vehicle truck adapted for engagement with the front axle of an automobile, the axle being conventionally shown and the tongue of the truck being omitted.

Fig. III is a detail vertical section on a line corresponding to line 3—3 of Fig. I.

Fig. IV is a detail section on a line corresponding to line 4—4 of Fig. II.

Fig. V is a detail vertical section of a modified form of my invention, the modification being in the form of the lifting means for the lifting bar.

Fig. VI is a detail section on a line corresponding to line 6—6 of Fig. V, a wrench or implement for turning the adjusting nut being shown in connection with the nut.

In the drawing similar reference characters refer to similar parts throughout the several views and the sectional views are taken looking in the direction of the little arrows at the ends of the section lines.

Referring to the drawing, the carrying wheels 1 are mounted upon suitable spindles or an axle carried by the body member 8 which is, in practice, a casting, and is provided with vertical sockets 3, preferably formed integral therewith, as illustrated, and at one side of its longitudinal center or vertical plane of axis to the wheels.

The standards 4 are removably engaged in these sockets, there being a socket adjacent each end of the body member and a centrally disposed socket.

The threaded lifting bars 5 telescope with these standards, a pair of standards being provided with arm-like heads 6 adapted to be engaged with the rear axle of a vehicle, shown at 7, between the truss rod 8 thereof and the axle.

Beveled gears 9 having annular racks 10 on their upper faces are mounted on the standards and above these are nuts 11 coacting with the threaded standards. The nuts are provided with reversible ratchet pawls 12 which coact with the racks.

Driving gears 13 are mounted on the sides of the standards to coact with the gears 9, the gears 13 being provided with lever-like handles 14. By an oscillating movement of these handles the nut, through the rack and pawl, is turned in the direction desired, the pawl being adjusted according as it is desired to raise or lower the standard.

In the form shown in Fig. II the head 15 is provided with a pair of diverging arms 16 having upwardly facing seats 17 for the front axle of the vehicle, as 18. Chains 19 are provided to be connected to the springs or some adjacent part of the frame, preventing lateral movement of the axle in the head.

Means for adjusting the lifting bar equipped with this form of head is the same as described.

In the modification shown in Figs. V and VI the actuating gears are omitted, the nut 20 resting directly on the upper end of the standard and being provided with holes 21 to receive the wrench 22.

The tongue 23 is detachably engaged with the socket 24 on the front of the body member.

With this arrangement of parts the structure may be quickly adjusted to or removed from either the front or rear axle of an automobile as desired. The lifting bars being independently adjustable facilitate this engagement as in a wrecked vehicle the axle is frequently tilted or otherwise out of position. The vehicle may be righted up as the truck is adjusted thereto.

Having thus described my invention, what I claim as new and desire to secure by Letters Patent, is:

1. In a truck of the class described, the combination with the carrying wheels, of a body member having spindles for said wheels at its ends and having vertical sockets adjacent its ends, tubular standards removably engaged in said sockets, threaded lifting bars telescoping with said standards, beveled gears rotatably mounted on said standards and provided with annular racks, nuts disposed above said gears to coact with said threaded lifting bars, said nuts being provided with reversible pawls coacting with said racks, and driving gears mounted on said standards to coact with said rack gears, said driving gears being provided with levers whereby they may be oscillated.

2. In a truck of the class described, the combination with the carrying wheels, of a body member having spindles for said wheels at its ends and a vertical socket, a tubular standard engaged in said socket, a threaded lifting bar telescoping with said standard and having a head adapted to be engaged with an axle, a beveled gear rotatably mounted on said standard and provided with an annular rack, a nut disposed above said gear to coact with said threaded lifting bar, said nut being provided with a reversible pawl coacting with said rack, and a driving gear mounted on said standard to coact with said rack gear, said driving gear being provided with a lever whereby it may be oscillated.

In witness whereof, I have hereunto set my hand and seal.

WALTER H. PARKIN. [L. S.]